US012083964B2

(12) United States Patent
Rook et al.

(10) Patent No.: US 12,083,964 B2
(45) Date of Patent: Sep. 10, 2024

(54) ROTATABLE DISPLAY (71) Applicant: BENTLEY MOTORS LIMITED, Crewe (GB)

(72) Inventors: David Alan Rook, Sandbach (GB); Jeff Brindle, Chester (GB); Ian Armstrong, Market Drayton (GB); Richard Stevens, Windermere (GB); Darren Day, Audlem (GB)

(73) Assignee: Bentley Motors Limited, Crewe (GB)

( * ) Notice: Subject to any disclaimer, the term of this patent is extended or adjusted under 35 U.S.C. 154(b) by 1553 days.

(21) Appl. No.: 16/341,422

(22) PCT Filed: Oct. 11, 2017

(86) PCT No.: PCT/GB2017/053072
§ 371 (c)(1),
(2) Date: Apr. 11, 2019

(87) PCT Pub. No.: WO2018/069699
PCT Pub. Date: Apr. 19, 2018

(65) Prior Publication Data
US 2020/0039444 A1 Feb. 6, 2020

(30) Foreign Application Priority Data

Oct. 14, 2016 (GB) .................... 1617468

(51) Int. Cl.
*B60R 11/02* (2006.01)
*B60K 35/00* (2024.01)
(Continued)

(52) U.S. Cl.
CPC .......... *B60R 11/0235* (2013.01); *B60K 35/00* (2013.01); *G06F 3/041* (2013.01);
(Continued)

(58) Field of Classification Search
CPC ......... B60R 11/0235; B60R 2011/0005; B60R 2011/0085; B60R 2011/0047;
(Continued)

(56) References Cited

U.S. PATENT DOCUMENTS 1,296,307 A * 3/1919 Moran .................... G09F 11/02
40/506
1,323,866 A * 12/1919 Ingalls .................... B60Q 1/34
116/43
(Continued)

FOREIGN PATENT DOCUMENTS

DE 4445826 A1 6/1996
DE 102012019980 A1 4/2014
(Continued)

OTHER PUBLICATIONS

EP-0551078-A1, Shioya et al., "System for Moving a Television Set Mounted On a Motor Vehicle", Jul. 1993. (Year: 1993).*
(Continued)

*Primary Examiner* — John Fitzgerald
*Assistant Examiner* — Tania Courson
(74) *Attorney, Agent, or Firm* — SCHWABE, WILLIAMSON & WYATT, P.C.

(57) ABSTRACT

An instrument panel has an aperture in which a display may be arranged. The instrument panel further comprises a rotatable display mechanism. The mechanism comprising at least three display surfaces supported on a rotatable support. A first display surface comprises a touch sensitive display screen; a second display surface comprises at least one dial or gauge; and a third display surface comprises a trim element. The support is mounted for rotation with respect to a mount and the mount is movable away from and towards the aperture in the instrument panel. In use each display surface may be arranged in the aperture. To change from one
(Continued)

display surface to another display surface, the mount is moved away from the instrument panel, the support is rotated and the mount is then moved back towards the instrument panel so as to align another display surface in the aperture.

18 Claims, 12 Drawing Sheets

(51) Int. Cl.
    *B60K 35/10*     (2024.01)
    *B60K 35/22*     (2024.01)
    *B60K 35/28*     (2024.01)
    *B60K 35/50*     (2024.01)
    *B60K 35/53*     (2024.01)
    *B60R 11/00*     (2006.01)
    *G06F 3/041*     (2006.01)

(52) U.S. Cl.
    CPC .............. *B60K 35/10* (2024.01); *B60K 35/22* (2024.01); *B60K 35/28* (2024.01); *B60K 35/50* (2024.01); *B60K 35/53* (2024.01); *B60K 2360/1438* (2024.01); *B60K 2360/167* (2024.01); *B60K 2360/682* (2024.01); *B60K 2360/816* (2024.01); *B60R 2011/0005* (2013.01); *B60R 2011/0085* (2013.01)

(58) Field of Classification Search
CPC ............ B60R 2011/0092; B60K 35/00; B60K 2370/1438; B60K 2370/167; B60K 2370/67; B60K 2370/682; B60K 2370/816; B60K 2370/126; B60K 2370/154; B60K 2370/195; B60K 2370/197; B60K 2370/334; B60K 2370/774; B60K 2370/828; B60K 37/02; B60K 37/04; G06F 3/041
See application file for complete search history.

(56) References Cited

U.S. PATENT DOCUMENTS

| | | | | |
|---|---|---|---|---|
| 1,959,481 | A * | 5/1934 | Leshko | B60Q 1/34 362/280 |
| 2,309,941 | A * | 2/1943 | Drummond | B60K 37/00 116/299 |
| 5,102,181 | A * | 4/1992 | Pinkney | B60K 37/04 312/305 |
| 5,347,734 | A * | 9/1994 | Howell | G09F 11/02 40/658 |
| 6,460,278 | B1 * | 10/2002 | Jurjavcic | G09F 15/0081 40/473 |
| 6,474,431 | B1 | 11/2002 | Baker et al. | |
| 6,568,345 | B1 | 5/2003 | Paulo | |
| 2014/0062891 | A1 | 3/2014 | Powell | |
| 2016/0016472 | A1 | 1/2016 | Konishi et al. | |

FOREIGN PATENT DOCUMENTS

| | | | | |
|---|---|---|---|---|
| EP | 3015313 A1 * | 5/2016 | | B60K 37/04 |
| FR | 2850329 A1 | 7/2004 | | |
| GB | 2555479 A * | 5/2018 | | B60K 35/00 |
| GB | 2556343 A * | 5/2018 | | B60K 35/00 |
| GB | 2568395 A * | 5/2019 | | B60K 35/00 |
| WO | WO2012147086 A1 | 11/2012 | | |

OTHER PUBLICATIONS

European Patent Application No. 17 797 173.6; Search Opinion; Jun. 9, 2020.
International Patent Application No. PCT/GB2017/053072; International Search Report dated Dec. 11, 2017.
GB Patent Application No. 1617468.2; IPO Search Report dated Mar. 6, 2018.
GB Patent Application No. 1617468.2; IPO Search Report dated Aug. 15, 2018.

* cited by examiner

ROTATABLE DISPLAY

CROSS-REFERENCE TO RELATED APPLICATION

This application is a 371 U.S. National Stage of International Application No. PCT/GB2017/053072, filed Oct. 11, 2017, entitled "ROTATABLE DISPLAY," which designated, among the various States, the United States of America, and which claims priority to GB 1617468.2, filed Oct. 14, 2016, both of which are hereby incorporated by reference in their entirety.

TECHNICAL FIELD OF THE INVENTION

The present invention relates to a rotatable display, especially to a rotatable display for a vehicle, and in particular, but not exclusively to a rotatable display in the instrument panel of an automobile.

BACKGROUND TO THE INVENTION

Instrument panels (IPs) of automobiles are provided in order to display information to the driver or passenger and to receive inputs from users. In order to display a multitude of different options/images many modern instrument panels include display screens, such as LCD screens or the like. Some instrument panels include touch screens and there is a tendency for these screens to become larger and larger to display more and more information, sometimes simultaneously displaying multiple interface windows (e.g. radio settings and satellite navigation).

Touch screens are generally hard-mounted in a single fixed position, in order to provide confidence in usage with no lateral/vertical movement, which could affect the accuracy of the position intended to be pressed by a user, nor axial movement (i.e. movement back and forth in the instrument panel), which could reduce haptic sensitivity and have a low-quality feel.

It has, however, been possible to mount display screens that are not touch-sensitive for movement. For example, EP0551078 discloses a television screen which is deployed out of a casing. The Rolls Royce Phantom has an instrument panel including a panel comprising a clock face which rotates to reveal a display screen.

The minimalist panel in the Rolls Royce with just the clock face is considered a mark of luxury, leading to an uncluttered surface when the display screen is not in use.

It is considered that a minimal amount of clutter on an instrument panel is associated with luxury (especially in combination with well-known markers of luxury, such as small and uniform gaps, flush surfaces, matching materials and so forth); a large touch-sensitive display screen is associated with modernity. On the other hand, dials, especially mechanical dials like stop watches, or additional gauges for oil pressure/temperature, water temperature and vacuum/turbo boost performance, as may be found in racing cars are associated with sportiness. In consequence, different styles of interior can be found in different cars, depending on the impression it is intended to convey to the driver/passengers.

The present invention seeks to provide an improved display mechanism for an instrument panel and an improved instrument panel comprising a display mechanism.

SUMMARY OF THE INVENTION

According to a first aspect of the present invention, there is provided a rotatable display mechanism for an instrument panel, the mechanism comprising at least three display surfaces: a first display surface comprising a touch sensitive display screen, a second display surface comprising at least one dial or gauge and a third display surface comprising a trim element.

Such a mechanism is capable of portraying any one of the hallmarks of modernity (though the touchscreen), sportiness (though dials/gauges) and luxury (through the provision of a surface comprising (preferably only) one or more trim elements which integrate with surrounding luxury materials and finishes). Consequently, it is ideal for a modern luxury performance automobile, but also useful for giving a greater luxury/sporty/modern appeal to a vehicle lacking one of those attributes.

Moreover, a rotatable display mechanism, may remind certain purchasers of the rotatable number plate of classic James Bond movies, and is likely to "surprise and delight" customers.

The third surface may comprise only trim elements, such as veneers e.g. in wood or leather, metallic embellishers and/or logos. The third surface may not include any display screen, dial or gauge. One or more trim element of the third surface may match and/or align with a like feature of an instrument panel. For example, wood grain may match and/or decorative features such as strips e.g. of brightware may extend across the third surface matching like features on the IP.

The second surface may include a plurality of dials or gauges. The plurality of dials or gauges may include one or more of a stop watch or a gauge for oil pressure, oil temperature, water temperature, vacuum performance, G-force or turbo boost performance.

According to a second aspect of the invention, there is provided an instrument panel having an aperture in which a display is deployable; the instrument panel further comprising a rotatable display mechanism, the mechanism comprising at least two display surfaces supported on a rotatable support; the support being mounted for rotation with respect to a mount and the mount being movable away from and towards the aperture in the instrument panel; whereby in use each display surface may be arranged in the aperture and wherein to change from one display surface to another display surface, the mount is moved away from the aperture in the instrument panel, the support is rotated and the mount is then moved back towards the aperture in the instrument panel so as to align another display surface in the aperture.

When deployed, a or each deployed display surface may be flush with a front surface of the instrument panel, in particular a front surface in the region adjacent the aperture. Movement of the mount away from the aperture may thus move a or each deployed display surface backwards away from the front surface of the instrument panel in the region adjacent the aperture, such that it is no longer flush.

The rotatable display mechanism may comprise at least three display surfaces, optionally more, e.g. four, five or six surfaces.

In order that the rotatable display mechanism may change from one display surface to each other display surface, the mount may be arranged to be moved away from the instrument panel, the support rotated and the mount then moved back towards the instrument panel so as to align another display surface in the aperture.

The mount may be pivotally mounted, so as to pivot away from and towards the instrument panel.

An actuator, such as a linear actuator, e.g. a worm drive may be mounted on a housing and operable to move the mount away from the instrument panel.

An actuator, such as a rotary actuator, e.g. a motor may be mounted on the mount and operable to rotate the rotatable support, for example via a belt.

The motor may be capable of rotating the rotatable support in both directions. This allows for movement between extreme positions without completing a full 360 degree turn. For example, for a triangular support with a display surface on each of three faces, rotation by 240 degrees can move between two extreme positions, each 120 degrees from a central position.

Avoiding the need for complete 360 degree motion means wiring can be relatively simple as rotary connections are not required.

The rotatable display mechanism may be a mechanism according to the first aspect of the invention, preferably including any of the optional features of the first aspect.

The rotatable display mechanism may comprise alignment means arranged to align the display surfaces in the aperture.

Alignment means may comprise an aligning surface provided on the rotatable support arranged to abut an aligning surface fixed in position relative to the instrument panel.

For example, the alignment means may comprise one or more projection associated with each display surface extending in the direction of the axis of rotation of the rotatable support and having an aligning surface. Each projection may abut an alignment surface of a housing in a fixed position, when the display surface is arranged in the aperture and be spaced from the alignment surface of the housing in a rotation position.

The rotatable support may be a prism having two opposing end faces on at least one of which alignment means are located and display faces on which the display surfaces are located. The prism may be triangular, with three display faces.

Alignment means may be provided on both end faces.

At least two projections may be provided on each opposing end face associated with each display surface (i.e. at least four projections may be associated with each display surface).

When the rotatable support is then moved back towards the instrument panel so as to align another display surface in the aperture, it may be overdriven, so as to form a strong connection, as if hard-fixed in place.

A/the touchscreen device/first display surface may be fastened to the rotatable support by screw fasteners, which may extend through lugs in the rotatable support.

The second and/or third display surfaces may be clipped or adhered to the rotatable support. By this arrangement, the fastening of the touchscreen device, which is to be pressed by a user is strong, whereas the connection of the other display surfaces, which will not be pressed, is weaker, but can be done from the outside without tools and hence without any visible fasteners.

DETAILED DESCRIPTION OF THE INVENTION

In order that the invention may be more clearly understood an embodiment thereof will now be described, by way of example only, with reference to the accompanying drawings, of which.

Figure 1:
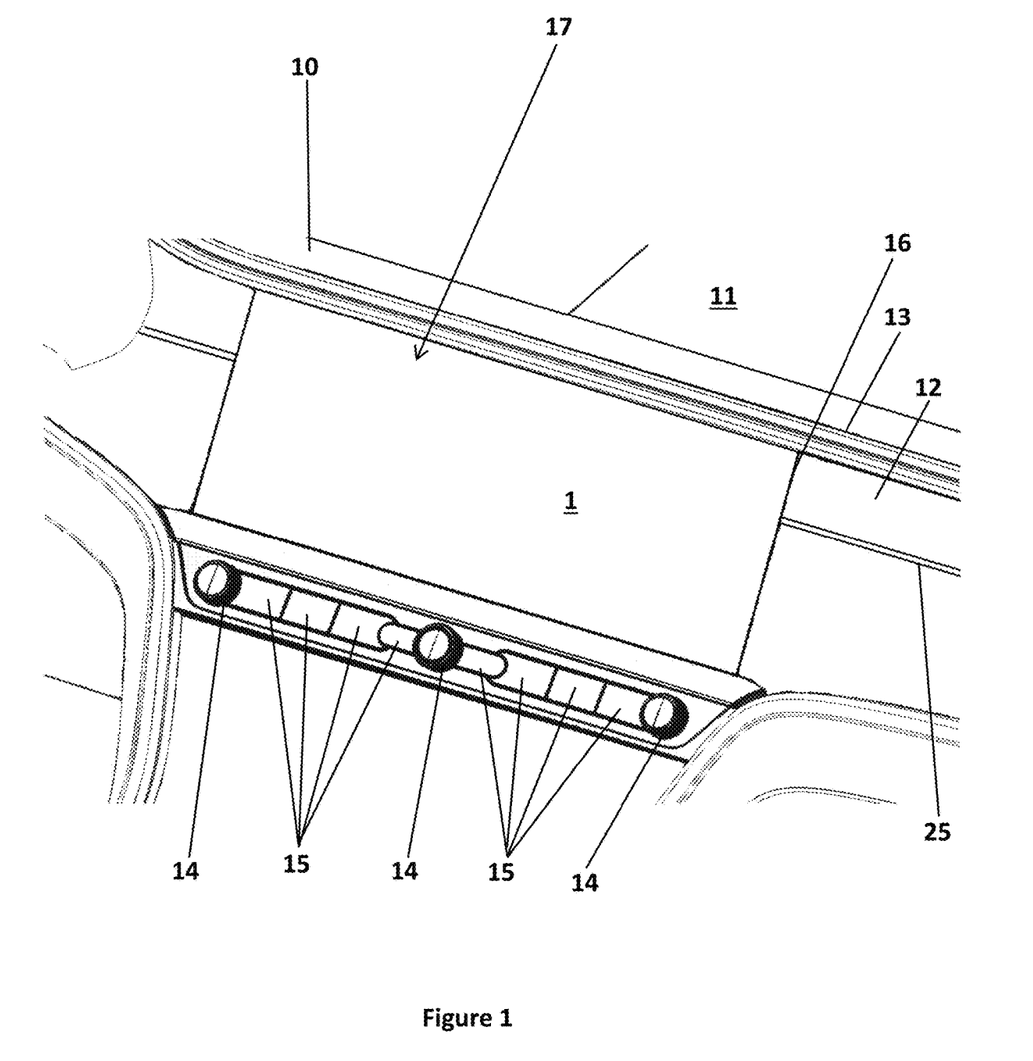
FIG. 1 shows a perspective view of part of the instrument panel of an automobile including a rotatable display mechanism according to the invention in a first display position.
Figure 2:
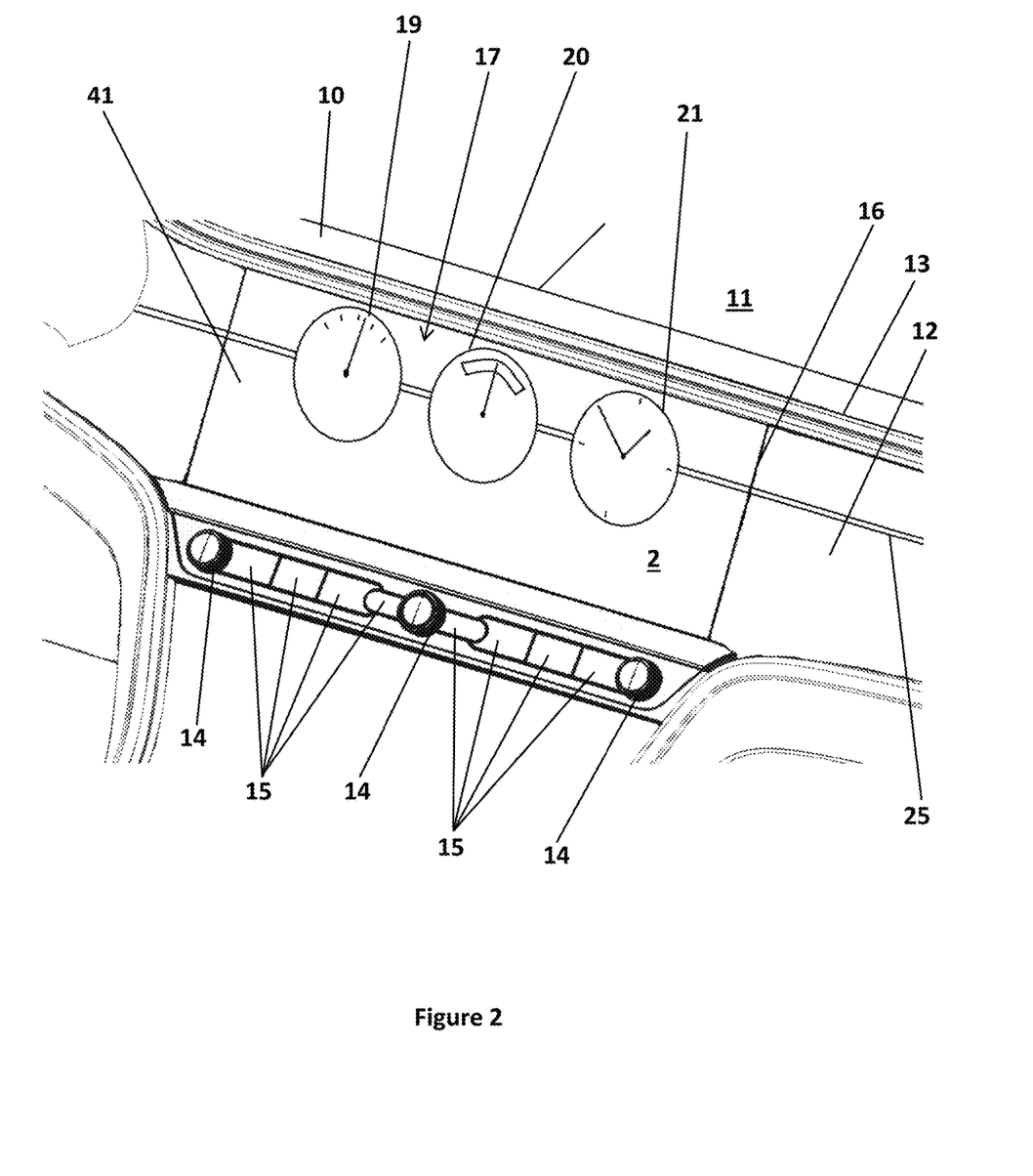
FIG. 2 shows a perspective view of part of the instrument panel of FIG. 1 including a rotatable display mechanism according to the invention in a second display position.
Figure 3:
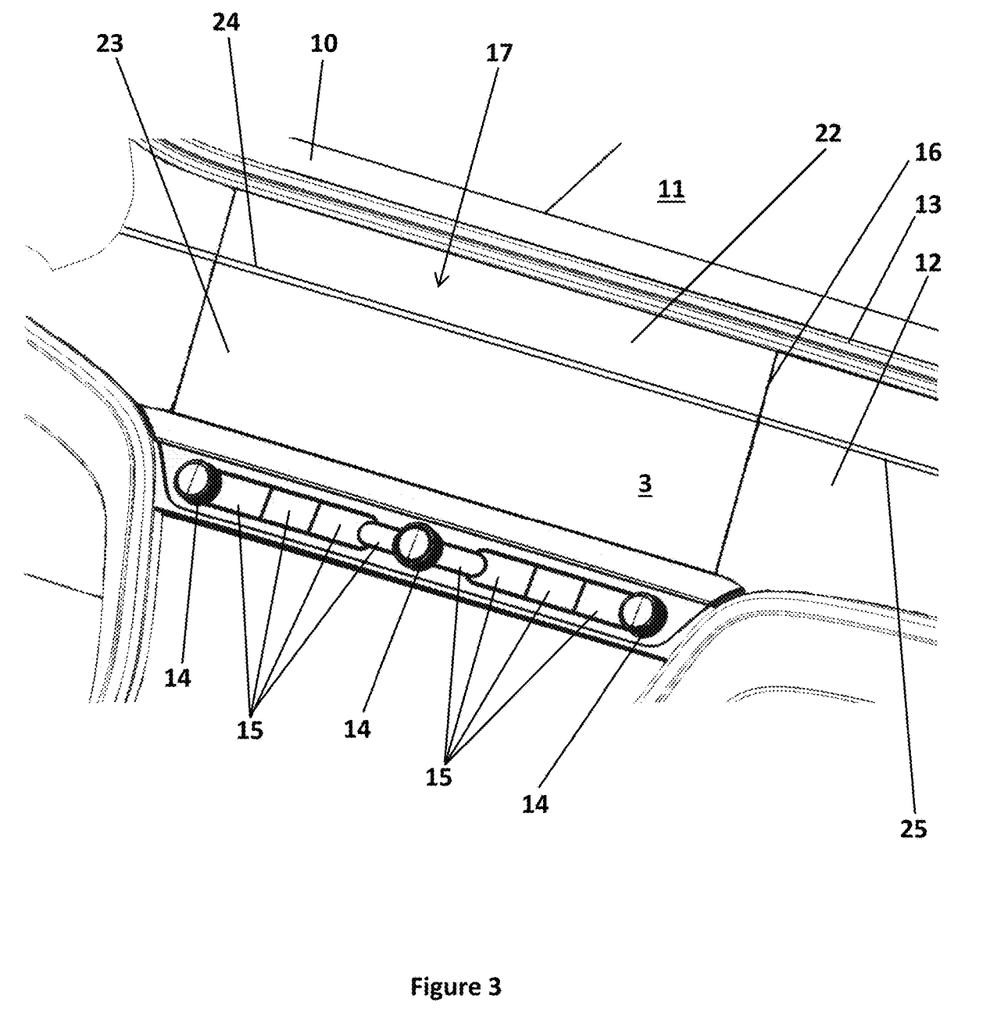
FIG. 3 shows a perspective view of part of the instrument panel of FIG. 1 including a rotatable display mechanism according to the invention in a third display position.
Figure 4:
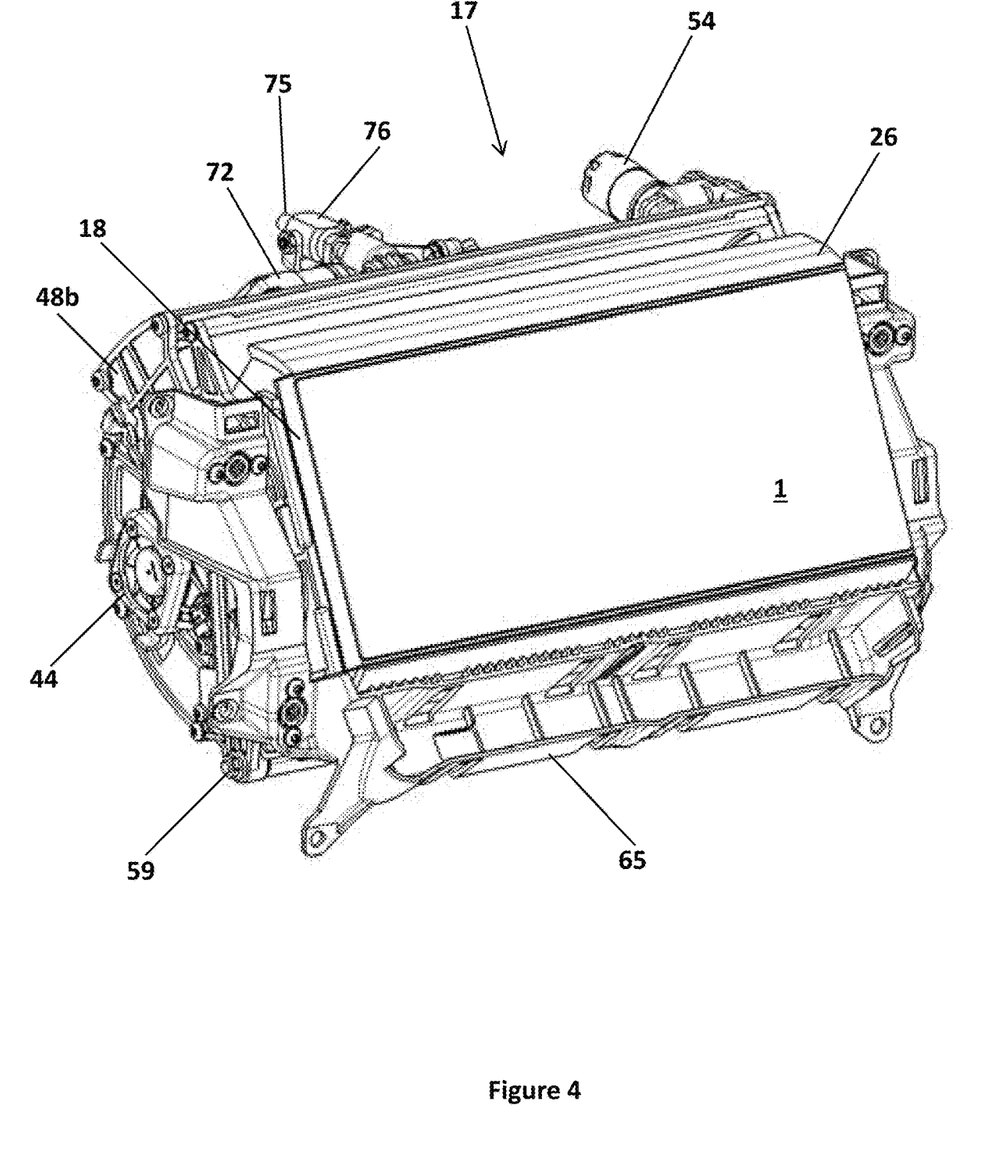
FIG. 4 shows a front perspective view of the rotatable display mechanism of FIG. 1 in the first display position and in the absence of the instrument panel.

With reference to the drawings, in particular FIGS. 1 to 3, an instrument panel 10 of an automobile is provided. The instrument panel (IP) 10 includes a substantially (but not entirely) horizontal surface 11, which extends to a windscreen (not shown), and a substantially vertical, but inclined surface 12, which is inclined so as to be more easily visible to the driver/passenger and depends from the substantially horizontal surface, beneath an overhang 13. As is conventional, the instrument panel comprises input devices, in the form of (in this case) (three) knobs 14 and buttons 15.

Of course, those skilled in the art will appreciate that this precise arrangement of the IP is by no means essential and the shape/orientation of the IP 10 and choice of input devices 14, 15 is largely a matter of style.

The IP 10 is also provided with an aperture 16, behind which a rotatable display mechanism 17 is located. The rotatable display mechanism comprises three display surfaces 1, 2, 3, each sized to be located neatly in the aperture 16, flush with the inclined surface 12 of the IP 10, when in a display position.

The first display surface 1, visible in FIG. 1 is the touch sensitive display screen of a touchscreen device 18 (shown in FIGS. 4, 8, 9 and 12).

Figure 5:
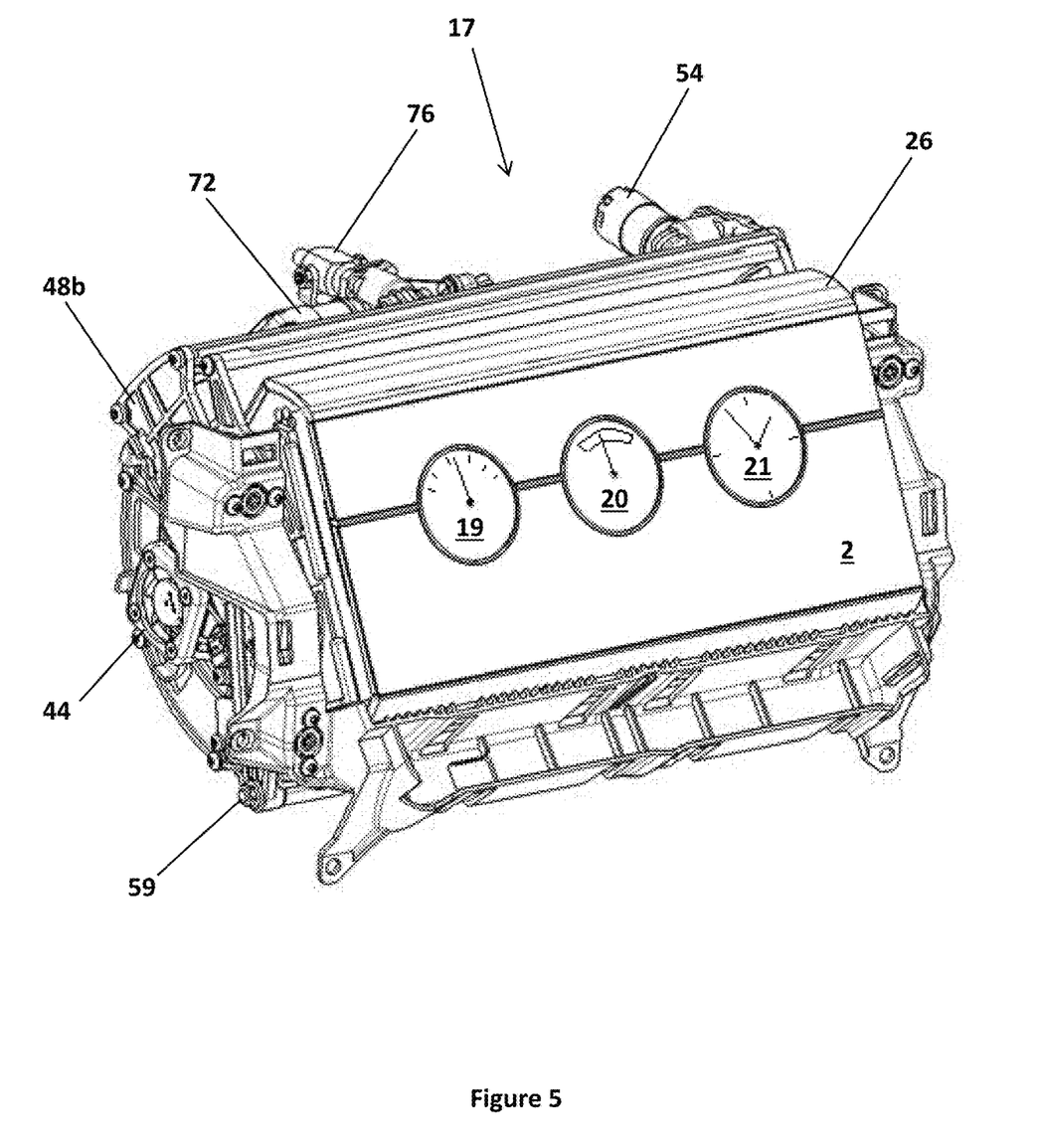
FIG. 5 shows a front perspective view of the rotatable display mechanism of FIG. 1 in the second display position and in the absence of the instrument panel.

The second display surface 2, visible in FIGS. 2 and 5, includes dials/gauges 19, 20, 21. In this embodiment, there are three dials/gauges 19, 20, 21, including a stop watch 21, an oil temperature gauge 20, and a turbo boost gauge 19. Of course, there do not necessarily have to be three dials/gauges 19, 20, 21 and one or two could be omitted. Likewise, alternative/additional dials/gauges could be provided, for example the dials/gauges 19, 20, 21 may be selected from a stop watch or a gauge for oil pressure, oil temperature, water temperature, vacuum performance, G-force or turbo boost performance.

Figure 6:
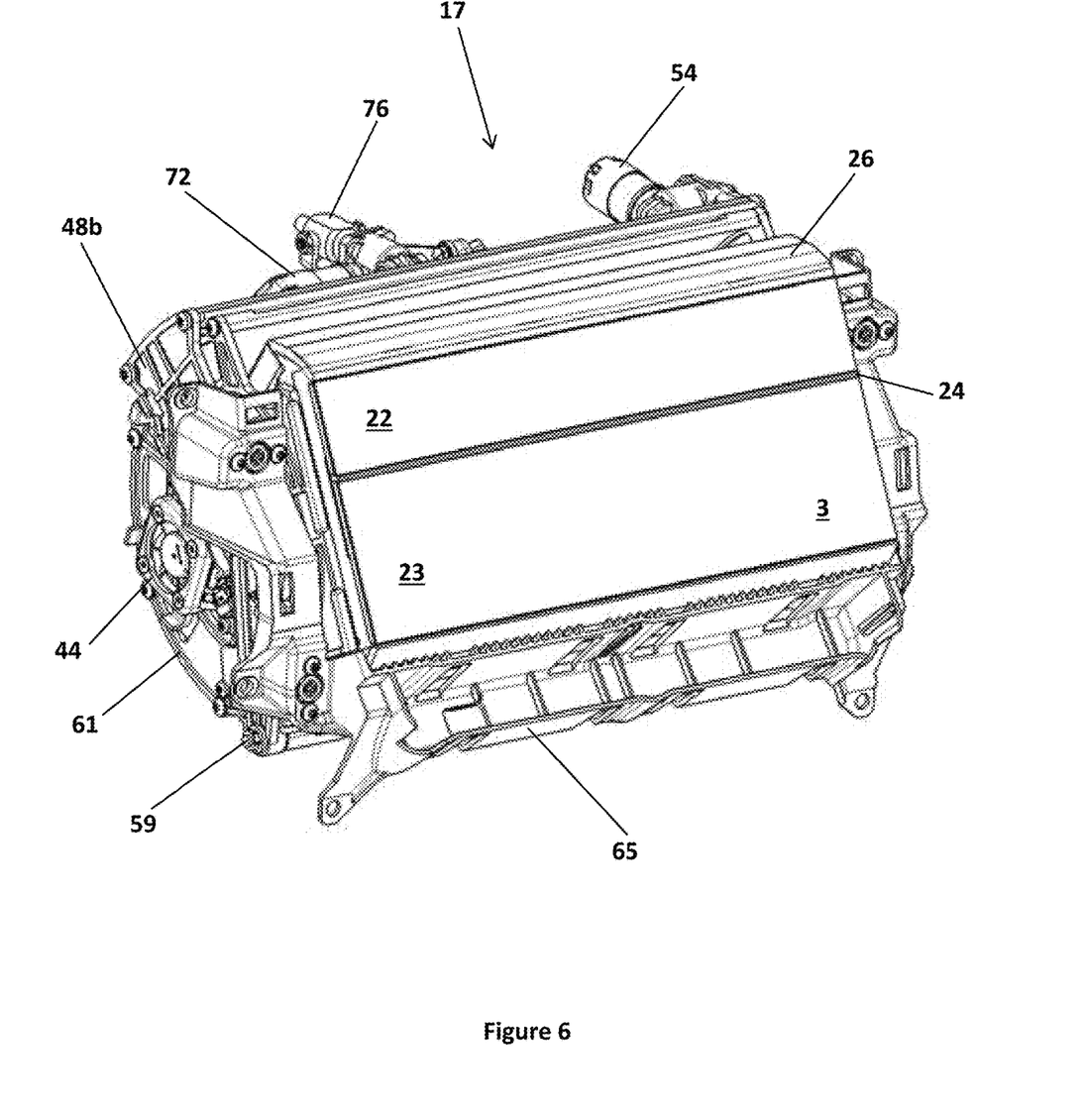
FIG. 6 shows a front perspective view of the rotatable display mechanism of FIG. 1 in the third display position and in the absence of the instrument panel.

The third display surface 3, visible in FIGS. 3 and 6 comprises only trim elements, designed to match with the surface of the IP 10 surrounding the aperture 16. Thus, for example, the embodiment shown comprises veneers in wood 22, 23, having patterns which match with the adjacent panels of the IP, separated by an embellisher in the form of a horizontally extending strip of metal embellisher 24. The third display surface is also an ideal place for a logo (not shown). The third surface does not include any display screen, dial or gauge. The ends of the horizontally extending embellisher 24 align precisely with similar strips 25 extending horizontally across the IP 10.

In the present embodiment, the second display surface 2 also comprises trim elements 41 which surround the dials/gauges 19, 20, 21 and which match the surface of the IP 10 surrounding the aperture 16.

As shown in FIGS. 4 to 9 and 12 in particular, each display surface 1,2,3 is provided on one display face of a rotatable support 26. The rotatable support 26 is generally triangular, having two opposing generally triangular end faces 27, 28 and three display faces extending between parallel edges of the triangular end faces. The interior of the rotatable support 26 is hollow, and in this embodiment, two of the display faces are open. Three struts 29 extend between opposite apexes of the triangular end faces 27, 28, with two struts being formed integrally with the closed display face 30.

Figure 12:
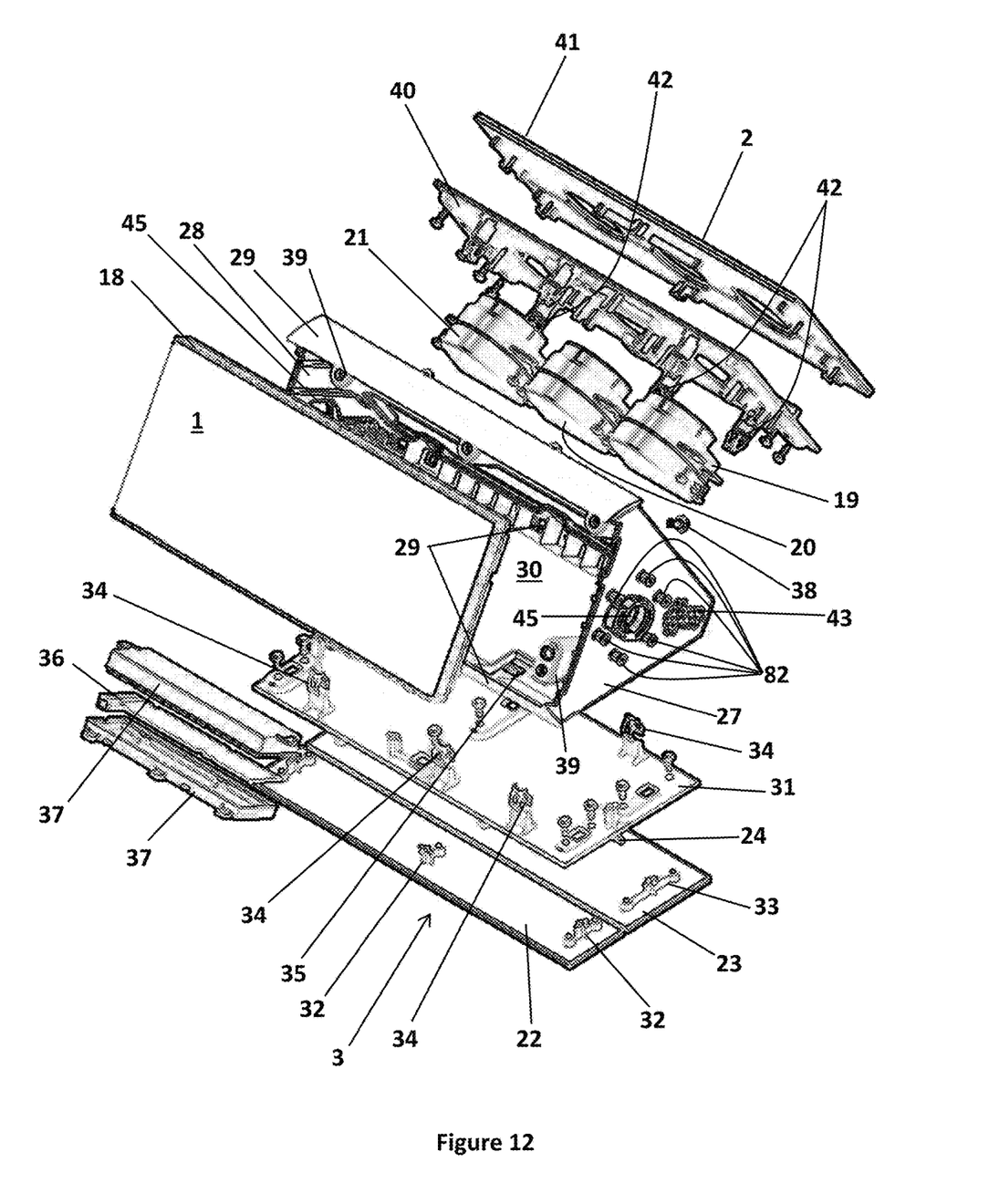
FIG. 12 shows a perspective exploded view of the display surfaces and the rotatable support of the rotatable display mechanism of FIG. 3.

The closed display face 30 supports the third display surface 3. With reference to FIG. 12, a veneer panel connector 31 is provided with an integral embellisher 24 projecting therefrom and with openings to fasten wooden veneers 22, 23 to the panel (separated by the embellisher 24) via fastenings 32, 33 formed on their reverse surfaces. The veneer panel connector is generally substantially planar and provided with clips 34 on its reverse side for clipping through openings 35 in the closed display face 30.

This connector 31 allows the third display surface 3 to be formed away from the rotatable support 26 and attached thereto at a later point in time. Of course, the trim elements could be attached directly to the closed display surface 30 without using the connector 31, and those skilled in the art could construct means for an attachment to the support 26 even if the closed display surface 30 was open.

Also shown in FIG. 12, but not attached to the rotatable support 26 is electronic control unit (ECU) 36 which in this case is provided within a box 37 for electrical connection to an input signal (not shown), to the touchscreen device 18 and to actuators (discussed below).

The touchscreen device 18 is provided at one of the open display faces of the rotatable support 26, attached in position via fasteners 38 through openings formed in lugs 39 extending from the closed display face and the strut 29 opposite thereto. Since the touchscreen device 18 will be pressed in use, it is firmly attached to the rotatable support by (in this embodiment) six threaded fasteners.

As with the third display surface 3, the second display surface 2, which comprises the dials/gauges 19 is also provided with a connector 40 to the rear of which the dials/gauges 19, 20, 21 are attached, so as to be visible through openings, and to the front of which trim elements 41 are attached to surround the dials/gauges 19, 20, 21.

As with the connector 31, the connector 40 also comprises clips 42, such that the second display surface 2 can be clipped into place (after the first display surface 1 has been installed).

This particular embodiment also comprises an infill panel 60 (visible in FIG. 11), which clips to the rotatable support after the second display surface 2 and third display surface 3 have been installed, simply to close the gap between them to look neat when the rotatable support 26 rotates.

A plurality of apertures 43 are provided on each end face 28, 29, through which a fan 44 (shown in FIG. 11) circulates air inside the rotatable support 26. In this embodiment there are two fans 44 and a plurality of apertures for each fan 44, but one fan may suffice, and it is possible that a fan may not be necessary.

Both end faces 27, 28 comprise openings 45 arranged centrally between the display surfaces 1, 2, 3. One opening (left hand side in FIGS. 11 and 12) is larger than the other, to allow electrical/mechanical cables (not shown) to extend into the interior of the support and to be connected to the dials/gauges 19, 20, 21 and the touch screen device 18.

Figure 8:
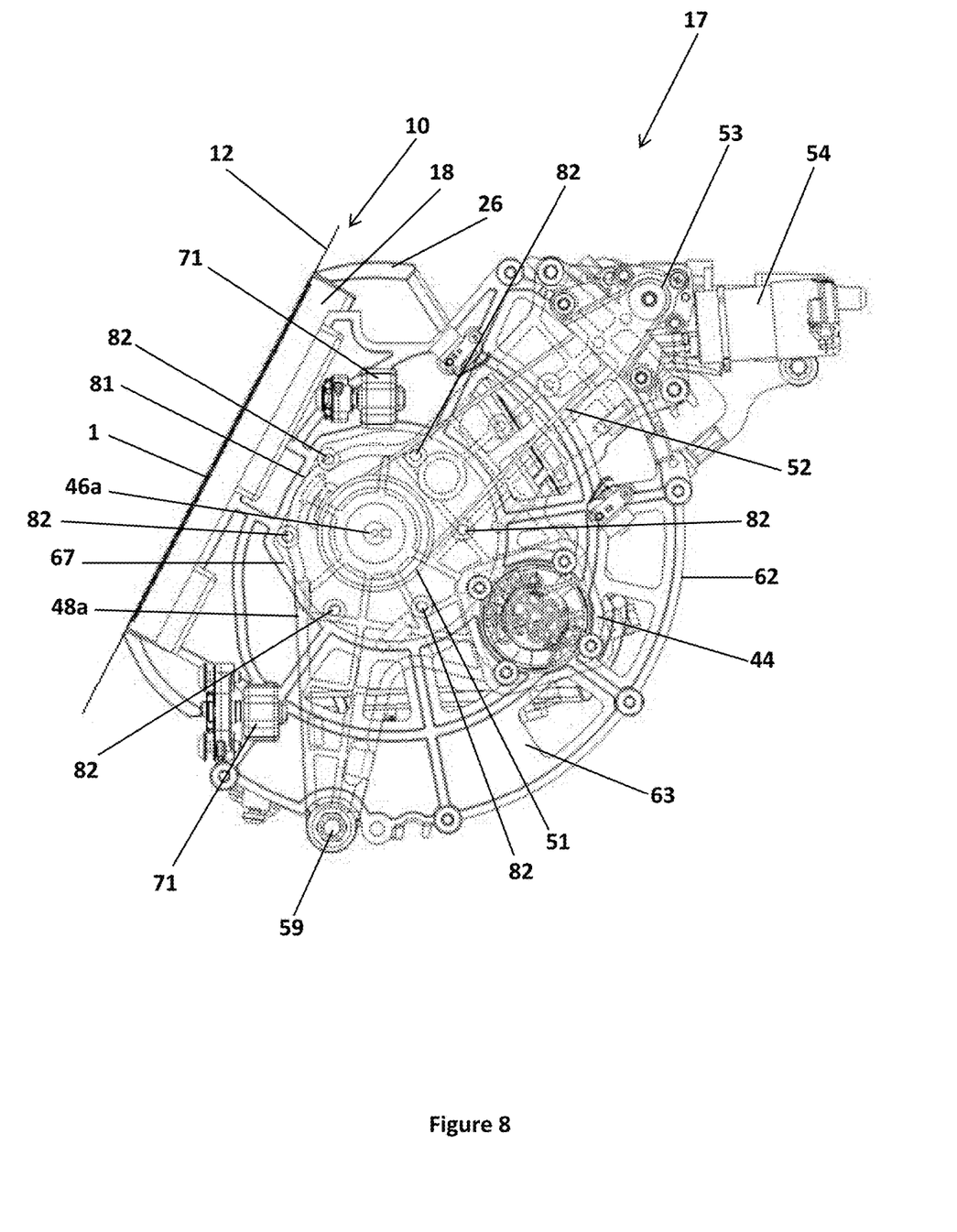
FIG. 8 shows a cross section through the instrument panel of FIG. 1 showing a side view of the rotatable display mechanism of FIG. 1 in a display position, with certain parts of the mechanism dotted such that parts behind them are visible.
Figure 9:
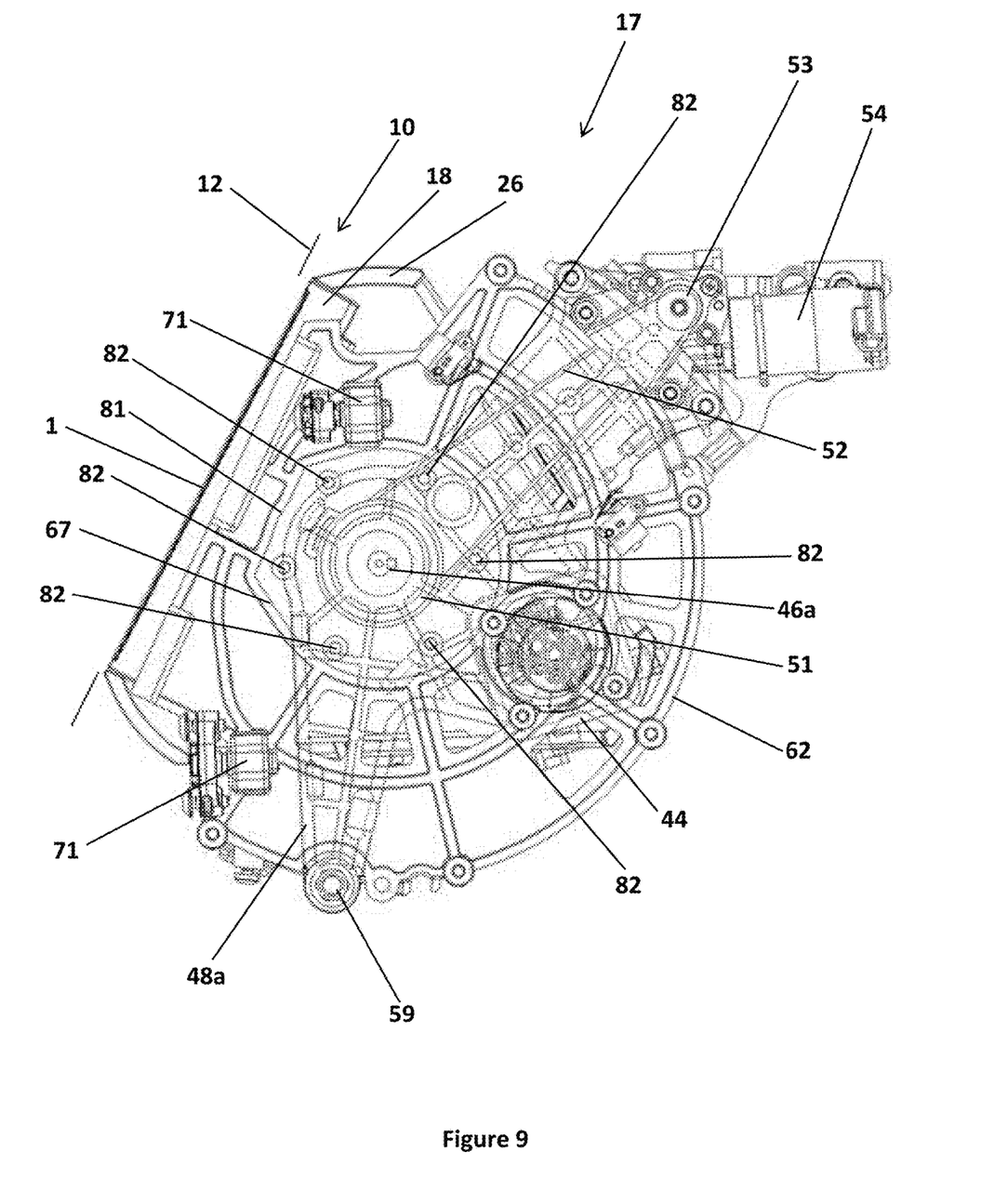
FIG. 9 shows a cross section through the instrument panel of FIG. 1 showing a side view of the rotatable display mechanism of FIG. 1 in a transition position, with certain parts of the mechanism dotted such that parts behind them are visible.
Figure 11:
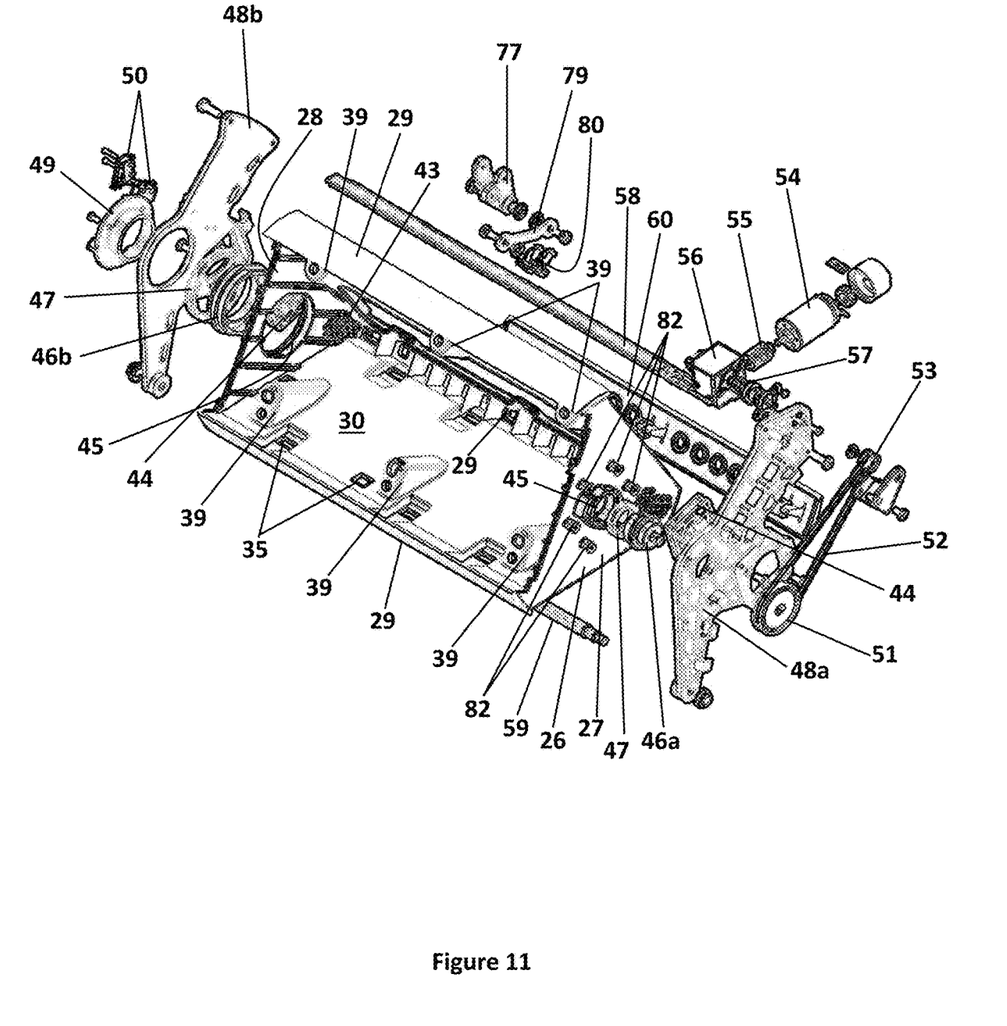
FIG. 11 shows a perspective exploded view of the movable parts of the rotatable display mechanism of FIG. 3, but without the display surfaces.

As seen best from FIG. 11, but also in FIGS. 8 and 9 (in which certain features are dotted so that parts behind them are visible), bearing inserts 46a, 46b are fitted (e.g. by interference fit) to the apertures 45, so as to be fixed in position relative to the rotatable support 26. The bearing inserts 46a, 46b carry the inner rings of bearings 47, the outer rings of which are fitted to apertures in a mount comprising pivotable arms 48a, 48b. Consequently, the rotatable support 26 is rotatable relative to the mount.

On one side (left hand side in FIG. 11), the bearing insert 46b is attached to a rotation switch carrier 49, which in this embodiment is annular (allowing cables to pass through it into the interior of the rotatable support 26) and carries micro-switches 50. On the other side, (right hand side in FIG. 11), the bearing insert 46a comprises a spindle, which extends through the aperture in the arm 48a and is attached to, and rotatable in synchrony with, a belt-driven pulley 51.

The belt-driven pulley 51 is connected via a belt 52 to an actuated pulley 53 rotatably mounted at one remote end of the arm 48a (upward and rearward of the aperture in the arm 48a). The actuated pulley 53 is rotated by a rotary actuator in the form of a motor 54, which drives a gearbox worm 55, connected within a gearbox housing 56 to a gearbox wheel 57 to provide appropriate torque to the actuated pulley 53 to rotate the rotatable support 26.

The mount further comprises a cross member 58 attached between one of the ends of the arms 48a, 48b (their upper and rearward ends). At the opposite end of the arms 48a, 48b (their lower and forward ends), they are connected by an axle 59.

Figure 10:
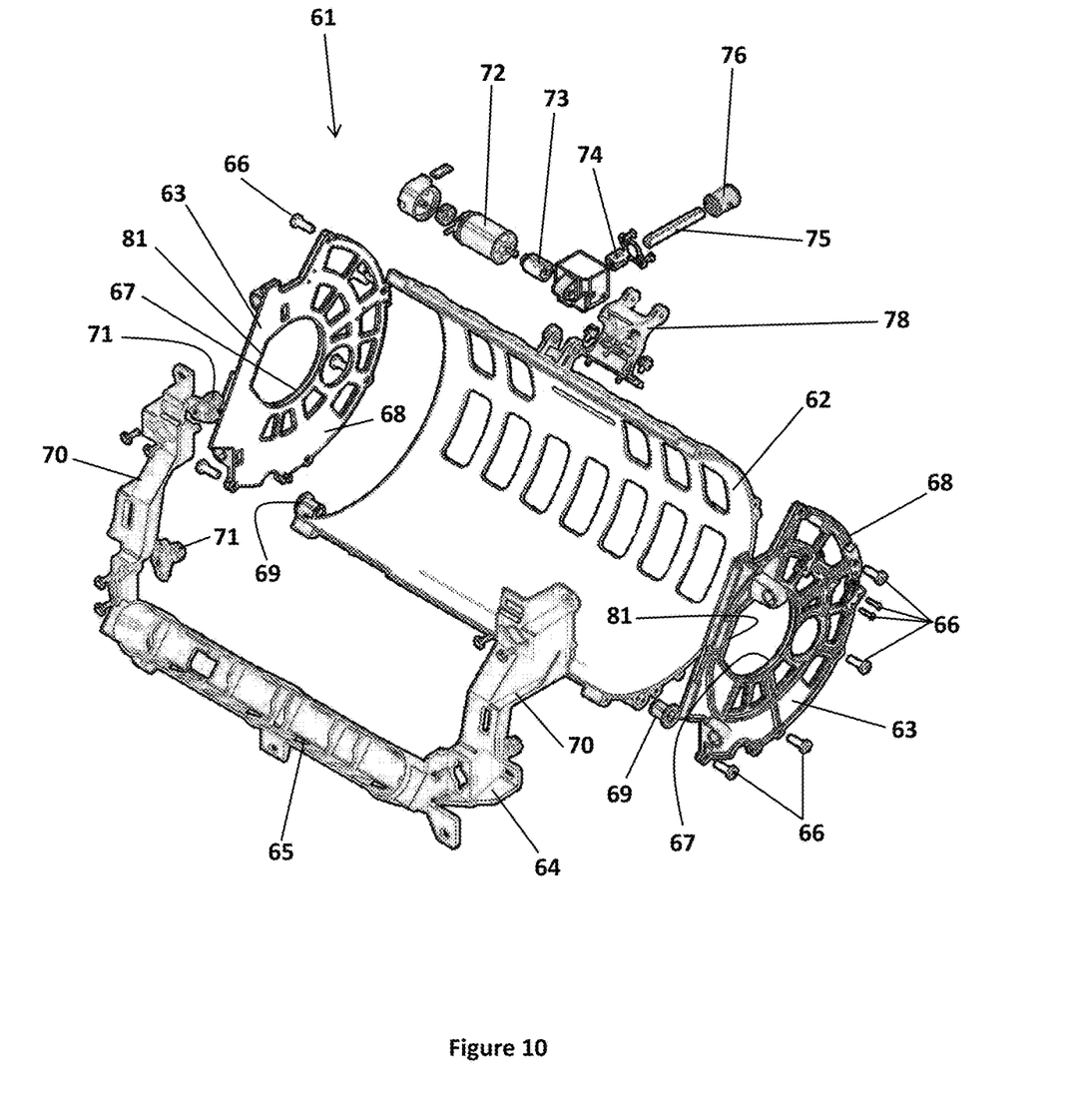
FIG. 10 shows a perspective exploded view of the fixed parts of the rotatable display mechanism of FIG. 3.

With reference to FIGS. 4-9 and in particular FIG. 10, the rotatable display mechanism comprises a housing, or casing, 61. The housing 61 is provided to be fixed in position to the vehicle, to provide a solid connection to the IP 10, in order that movement of the rotatable support 26 carrying the display surfaces 1, 2, 3, relative to the housing results in corresponding movement relative to the aperture 16 in the IP 10, with repeatable results, always moving to the same relative position.

The housing 61 consists of a main body 62, a pair of end caps 63 and a bracket 64. The main body 62 is in the form of a curved plate having a C-shaped cross section, with a number of apertures in the plate to allow air to circulate.

The main body 62 of the housing 61 extends around the rear of the rotatable support 26 and is spaced from the rotatable support 26 so that the rotatable support 26 can pivot back and forth with respect to the housing 61. Located at the forward, lowermost part of the main body of the housing 62 are a pair of bearings 69, which support the axle 59 for rotation about an axis extending laterally across the IP 10, so as to allow the arms 48a, 48b to pivot back and forth about the axis of the axle 59, moving the rotatable support 26, on which the display surfaces 1, 2, 3 are mounted towards and (rearwardly) away from the aperture 16 in the IP 10.

The end-caps 63 are also plate-like and are attached to both sides of the main body 62 (in this case by a plurality of fasteners 66). The end caps are also provided with a number of perforations, and in particular they each comprise a large aperture 67, through which the bearing inserts 46a, 46b extend, such that the pivotable arms 48a, 48b can be mounted outside the housing 61. The also comprise a relatively large aperture 68 in the region where the fans 44 are mounted to the arms 48a, 48b, so as not to obstruct airflow.

The bracket 64 is a substantially U-shaped member, having a lower rail 65 which is connected to the end caps 63, 64 and in use mounted to the body of the vehicle (not shown). From the distal ends of the lower rail 65, upwardly (and rearwardly) extending limbs 70 extend. These too are (in use) mounted to the body of the vehicle (not shown), and are also connected via positional adjusters 71 to the end caps, so as to align the housing 61 (and hence the display surfaces 1, 2, 3 mounted on the rotatable support 26 within it) perfectly with respect to the aperture in the IP 10.

At the rear of the housing 61 towards the top of the main body 62, a linear actuator is arranged to push the cross member 58 (and hence the top of the arms 48a, 48b) back and forth, so as to pivot the rotatable support 26 back and forth.

Figure 7:
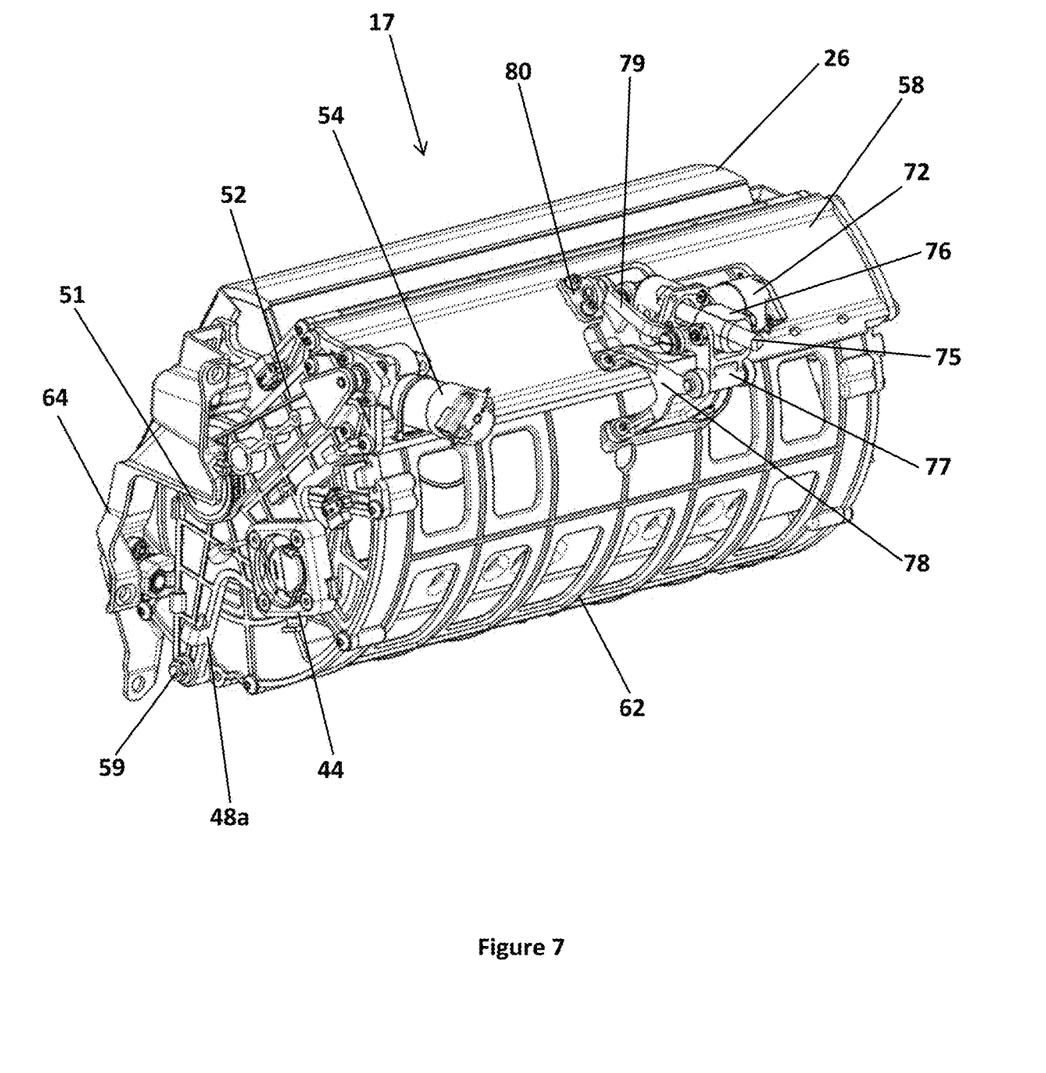
FIG. 7 shows a rear perspective view of the rotatable display mechanism of FIG. 1 in the absence of the instrument panel.

As best seen from FIGS. 7, 10 and 11, The linear actuator of this embodiment takes the form of a motor 72, which drives a gearbox worm 73, so as to rotate a gearbox wheel 74 connected to a drive screw 75. A captive worm nut 76 is provided on the screw 75, so as to move fore and aft in response to rotation of the screw 75.

The captive nut 76 is in turn connected to a driven link 77, which is pivotally mounted with respect to the housing 61 on a drive link support 78. The driven link 77 is, in turn connected to a drive link 79, mounted via a driven link support 80 to the cross member 58.

Actuation of the linear actuator to moves the rotation support 26 between a forward position shown in FIG. 8, in which the display surface 1, 2, 3 is flush with the IP 10 and a rearward position shown in FIG. 9, in which the rotation support 26 is moved away from the IP 10 rearwards, towards the back of the housing 61.

In order to ensure that each display surface 1, 2, 3 is always perfectly flush with the front of the inclined surface 12 of the IP 10 he rotatable display mechanism 17 comprises alignment means arranged to align the display surfaces 1, 2, 3 in the aperture.

In this embodiment, the alignment means comprises aligning surfaces provided on the rotatable support arranged to abut aligning surfaces 81 on housing 61 fixed in position relative to the instrument panel.

The aligning surfaces 81 of the housing 61 are provided in this embodiment as flat surfaces running parallel to the inclined surface 12 of the IP at the front of the apertures 67 in the end caps 63.

The aligning surfaces of the rotatable support 26 are provided by projections 82 which are arranged on the end faces 27, 28 of the rotatable support extending in the direction of the axis of rotation of the rotatable support and projecting into respective apertures 67.

Two projections 82 are associated with each end face for each display surface 1, 2, 3. Consequently, each display surface 1, 2, 3 has four associated projections 82 and each end face has six associated projections 82. Thus, there are a total of twelve projections. When a respective display surface 1, 2, 3 is pivoted forward into the display position, the alignment surfaces of its respective projections 82 bear upon the alignment surface 81 of the housing 61.

In this embodiment, the alignment surface 81 is substantially flat parallel with the inclined surface 12; the projections 82 are similarly arranged with the line between their alignment surfaces being parallel with their respective display surface 1, 2, 3 the projections are separated by a suitable distance that when the rotatable support 26 is pushed forward by the linear actuator, so that the projections 82 bear against the alignment surface of the aperture 67, pressing the display surface 1, 2, 3, even at its corners cannot rock it backwards in the housing 61.

Of course those skilled in the art will appreciate that the projections and alignment surface 81 of the housing 61 need not necessarily be parallel with the inclined surface 12, provided they are both offset from parallel by the same amount. However, being parallel is preferred from the point of view of a stable connection.

In use, the rotatable display mechanism 17 is assembled by wiring up the dials/gauges 19, 20, 21 and the display screen 18, with the cables extending through the larger aperture 45 in the triangular end face 28, screwing the touch screen device 18 to the rotatable support, then assembling and clipping in the second and third display surfaces 2, 3 via their respective connectors 31, 40. The infill panel 60 is then clipped in place and the bearing inserts 46a 46b and bearings 47 put in place. The ECU 36 is connected up, in its box 37, and the rotatable support is introduced into the housing 61, such that the bearings 47 extend through the end caps 63, the end caps 63 in turn being attached to the main body 61 of the housing before the arms 48a, 48b, carrying the fans 44 are attached to respective bearings 47, outside the end caps 63.

The linear and rotary actuators and their associated drive-components are then attached in order to allow the arms 48a, 48b to pivot and the rotatable support 26 to rotate, then the housing 61 is connected to the body of the automobile via the bracket 65, and adjusted with the positional adjusters 71 so that with the alignment surface 81 of the housing and the projections 82 abutting, the display surface 1, 2, or 3 is aligned centrally in the aperture 16 flush with the inclined surface 12.

The micro-switches 50 arranged on the carrier 40 are positioned so as to determine when the rotatable support 26 is pivoted forward to its display position and when it is pivoted rearwards, in order that the rotary actuator only acts when the rotatable support 26 is pivoted rearwards. The ECU, touch screen 18 and dials/gauges 19, 20, 21 are then connected to suitable sources (e.g. to receive electrical signals from a central ECU and/or inputs 14, 15 on the IP, or in the case of the dials/gauges 19, 20, 21 to suitable measurement apparatus.

The first display surface 1, second display surface 2, and third display surface 3 can then be displayed at will by pivoting back the arms and hence moving the rotatable support backwards from the position shown in FIGS. 1, 2, 3 and 9 to the position shown in FIG. 9, then rotating it with the rotary actuator such that a different display surface 1, 2, 3, is facing forward, before pivoting it back (with the linear actuator) until respective alignment surfaces 81, 82 meet and a new display surface is provided in the aperture 16 with accurate and minimal gaps between the deployed surface 1, 2, 3 and the fixed surface of the IP 10 surrounding it. Pivoting rearwards moves the projections 82 away from the alignment surface 81 of the aperture 67 sufficiently that they will not interfere with one another in rotation.

In addition to, or as an alternative to choosing between the active faces using one or more input 14, 15 on the IP, it is preferred that the touchscreen surface 1 can be automatically presented when instructed to by the vehicle control system. For example, the touchscreen surface 1 may be deployed in response to turning the vehicle on, or in response to selecting reverse gear, to show the view from a reversing camera.

The pivoting rearwards away from the aperture 16 allows tight cosmetic gaps whilst providing sufficient kinematic clearance. Use of a separate actuator for the pivoting and rotation also assists in achieving a high level of positional control.

The first display surface 1, which is the touch sensitive display screen of a touchscreen device 18 is set as the nominal (middle) position, and the rotatable support is rotated in one direction (top moving downwards) by 120 degrees to display the dials/gauges 19, 20, 21 on the second display surface 2, or by 120 degrees in the opposite direction (bottom moving upwards) to display the third display surface 3, visible in FIGS. 3 and 6 which comprises only trim elements, designed to match with the surface of the IP 10 surrounding the aperture 16. The rotatable support does not rotate infinitely, to avoid tangling cables (or requiring more complex rotary connections).

The third display surface 3 may be the neutral surface, displayed when the car is switched off, or the touchscreen is not selected, in order to portray smoothness and luxury, with the touchscreen 18 automatically deployed as necessary and the dials/gauges 19, 20, 21 only displayed in response to selecting a "sports" or "race" mode, or manually selecting the second display surface 2.

A hall sensor (not shown) counts motor rotations of the rotary actuator to accurately achieve rotational end positions without any physical end stop/limit, based on a calculated mid-point between physical end positions.

The fine position is achieved using the alignment means. If the system relied on rotational control only for position, it would be free to rotate by whatever free play was present in the rotational system (which could be substantial, given the number of intervening parts between the motor 54 and the support 26. Consequently, owing to the pivoting back and forth and the alignment means, the system is stable during touchscreen 18 use and well aligned with the IP 10 surrounding the aperture 16.

In each deployed position, the linear actuator is overdriven by a controlled amount to force the alignment surfaces of the projections 82 against alignment surfaces 81 of the apertures 67.

The above embodiment is described by way of example only. Many variations are possible without departing from the scope of the invention as defined in the appended claims.

The invention claimed is:

1. An instrument panel having an aperture in which a display surface is deployable; the instrument panel further comprising a rotatable display mechanism, the mechanism comprising at least two display surfaces supported on a rotatable support; the rotatable support being mounted for rotation with respect to a mount and the mount being pivotally mounted and movable away from and towards the aperture in the instrument panel; whereby in use each display surface may be arranged in the aperture and wherein to change from one display surface to another display surface, the mount is pivoted away from the aperture in the instrument panel, the rotatable support is rotated and the mount is then pivoted back towards the aperture in the instrument panel so as to align another display surface in the aperture.

2. The instrument panel according to claim 1 wherein the rotatable display mechanism comprises at least three display surfaces.

3. The instrument panel according to claim 1 wherein in order to allow change from one display surface to each other display surface, the mount of the rotatable display mechanism is arranged to be moved away from the instrument panel, the rotatable support rotated and the mount then moved back towards the instrument panel so as to align another display surface in the aperture.

4. The instrument panel according to claim 1 wherein the rotatable display mechanism comprises a linear actuator mounted on a housing and operable to move the mount away from the instrument panel.

5. The instrument panel according to claim 1 wherein when the rotatable support is then moved back towards the instrument panel so as to align another display surface in the aperture, it is overdriven.

6. A vehicle comprising the instrument panel according to claim 1.

7. The instrument panel according to claim 1 wherein the rotatable display mechanism comprises alignment means arranged to align the display surfaces in the aperture wherein alignment means comprises an aligning surface provided on the rotatable support arranged to abut an aligning surface fixed in position relative to the instrument panel.

8. The instrument panel according to claim 7 wherein the alignment means comprises one or more projection associated with each display surface extending in the direction of the axis of rotation of the rotatable support and having an aligning surface arranged to abut an alignment surface of a housing in a fixed position, when the display surface is arranged in the aperture; the each projection arranged to be spaced from the alignment surface of the housing in a rotation position.

9. The instrument panel according to claim 1 wherein the rotatable display mechanism comprises a rotary actuator mounted on the mount and operable to rotate the rotatable support.

10. The instrument panel according to claim 9 wherein the rotary actuator is capable of rotating the rotatable support in both directions.

11. The instrument panel according to claim 1 wherein the rotatable support is a prism having two opposing end faces on at least one of which alignment means are located and display faces on which the display surfaces are located.

12. The instrument panel according to claim 11 wherein alignment means are provided on both end faces.

13. The instrument panel according to claim 12 wherein at least two projections are provided on each opposing end face associated with each display surface.

14. The instrument panel according to claim 1 wherein the rotatable display mechanism comprises at least three display surfaces: a first display surface comprising a touch sensitive display screen, a second display surface comprising at least one dial or gauge and a third display surface comprising a trim element.

15. The instrument panel according to claim 14 wherein the second surface includes a plurality of dials or gauges selected from: a stop watch or a gauge for oil pressure, oil temperature, water temperature, vacuum performance, G-force or turbo boost performance.

16. The instrument panel according to claim 14 wherein the first display surface is fastened to the rotatable support by screw fasteners and wherein the second and/or third display surfaces are clipped or adhered to the rotatable support.

17. The instrument panel according to claim 14 wherein the third surface comprises only trim elements.

18. The instrument panel according to claim 17 wherein one or more trim element of the third surface matches and/or aligns with a like feature of the instrument panel.

* * * * *